(12) United States Patent
Muldoon et al.

(10) Patent No.: US 9,599,019 B2
(45) Date of Patent: Mar. 21, 2017

(54) DUAL OIL SUPPLY TUBE

(71) Applicant: UNITED TECHNOLOGIES CORPORATION, Farmington, CT (US)

(72) Inventors: Marc J. Muldoon, Marlborough, CT (US); Gary L. Grogg, South Berwick, ME (US); Grace E. Szymanski, Brulington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 14/609,095

(22) Filed: Jan. 29, 2015

(65) Prior Publication Data

US 2015/0219011 A1    Aug. 6, 2015

Related U.S. Application Data

(60) Provisional application No. 61/936,109, filed on Feb. 5, 2014.

(51) Int. Cl.
 *F02C 1/00*  (2006.01)
 *F02C 7/06*  (2006.01)
 *F01D 25/18* (2006.01)

(52) U.S. Cl.
 CPC ............ *F02C 7/06* (2013.01); *F01D 25/18* (2013.01); *F05D 2240/53* (2013.01); *F05D 2250/311* (2013.01); *F16N 2210/02* (2013.01)

(58) Field of Classification Search
 CPC .......... F02K 3/077; F02K 3/115; F01D 25/18; F01D 25/16; F02C 7/06; F16N 2210/02
 See application file for complete search history.

(56) References Cited

U.S. PATENT DOCUMENTS

| | | | |
|---|---|---|---|
| 6,003,297 A * | 12/1999 | Ziegner | 60/776 |
| 6,438,938 B1 * | 8/2002 | Burkholder et al. | 60/39.08 |
| 2013/0189071 A1 * | 7/2013 | Durocher et al. | 415/1 |

* cited by examiner

*Primary Examiner* — Gerald L Sung
(74) *Attorney, Agent, or Firm* — Cantor Colburn LLP

(57) ABSTRACT

The present disclosure relates generally to a dual oil supply tube for a gas turbine engine. The dual oil supply tube locates a scheduled damper supply tube inside a compartment oil supply tube which remains full while the engine is operating.

20 Claims, 5 Drawing Sheets

DUAL OIL SUPPLY TUBE

CROSS REFERENCE TO RELATED APPLICATION

This application claims the benefit of and incorporates by reference herein the disclosure of U.S. Ser. No. 61/936,109, filed Feb. 5, 2014.

TECHNICAL FIELD OF THE DISCLOSURE

The present disclosure is generally related to gas turbine engines and, more specifically, to a dual oil supply tube for a gas turbine engine.

BACKGROUND OF THE DISCLOSURE

Hydrodynamic dampers are used in gas turbine engines to damp vibrations at rotating bearings. A film of oil is provided between the rotating bearing and the bearing support in order to damp these vibrations. This oil is often supplied through a tube. It is desirable in some applications for the oil supply to the hydrodynamic damper to be scheduled, i.e., turned off during some engine operating conditions in order to change the stiffness of the bearing. The need to turn off the oil flowing through the oil supply tube prevents the use of such tubes in hot sections of the engine where temperatures are high enough to cause coking of the oil residue remaining in the oil supply tube when oil is not continuously flowing therethrough.

Improvements are therefore needed in gas turbine engine oil supply tubes.

SUMMARY OF THE DISCLOSURE

In one embodiment, a dual oil supply tube for a gas turbine engine is disclosed, the dual oil supply tube comprising: a compartment oil supply tube configured to supply oil to a bearing compartment of the gas turbine engine; and a scheduled damper supply tube at least partially disposed within the compartment oil supply tube, the scheduled damper supply tube configured to supply oil to a damper of the gas turbine engine.

In a further embodiment of the above, wherein the compartment oil supply tube continuously supplies oil to a bearing compartment of the gas turbine engine while the gas turbine engine is operating and the scheduled damper supply tube intermittently supplies oil to a damper in the bearing compartment.

In a further embodiment of any of the above, wherein the compartment oil supply tube comprises an insulated tube.

In a further embodiment of any of the above, wherein compartment oil supply tube includes a ceramic-based insulation material.

In a further embodiment of any of the above, further comprising: a first supply connection coupled to a proximal end of the scheduled damper supply tube; and a second supply connection coupled to a proximal end of the compartment oil supply tube.

In a further embodiment of any of the above, further comprising: a first threaded connector disposed on the first supply connection; and a second threaded connector disposed on the second supply connection.

In a further embodiment of any of the above, further comprising: a first mounting flange coupled to the compartment oil supply tube; and a second mounting flange coupled to the compartment oil supply tube.

In a further embodiment of any of the above, wherein the second mounting flange includes a bore formed therein, the bore fluidicly coupled to the compartment oil supply tube.

In a further embodiment of any of the above, wherein the scheduled damper supply tube extends through the bore.

In another embodiment, a gas turbine engine is disclosed, comprising: a compressor section, a combustor section, and a turbine section in serial flow communication and disposed within an engine static structure defining a core flow path, the turbine section including a bearing compartment; a dual oil supply tube including a proximal end disposed exterior to the engine static structure and a distal end disposed within the engine static structure, the dual oil supply tube comprising: a compartment oil supply tube configured to supply oil to the bearing compartment; and a scheduled damper supply tube at least partially disposed within the compartment oil supply tube, the scheduled damper supply tube configured to supply oil to a damper disposed within the bearing compartment.

In a further embodiment of the above, wherein the compartment oil supply tube continuously supplies oil to the bearing compartment while the gas turbine engine is operating and the scheduled damper supply tube intermittently supplies oil to the damper in the bearing compartment.

In a further embodiment of any of the above, wherein the compartment oil supply tube comprises an insulated tube.

In a further embodiment of any of the above, wherein compartment oil supply tube includes a ceramic-based insulation material.

In a further embodiment of any of the above, further comprising: a first supply connection coupled to a proximal end of the scheduled damper supply tube; and a second supply connection coupled to a proximal end of the compartment oil supply tube.

In a further embodiment of any of the above, further comprising: a first threaded connector disposed on the first supply connection; and a second threaded connector disposed on the second supply connection.

In a further embodiment of any of the above, further comprising: a first mounting flange coupled to the compartment oil supply tube; and a second mounting flange coupled to the compartment oil supply tube.

In a further embodiment of any of the above, wherein the second mounting flange includes a bore formed therein, the bore fluidicly coupled to the compartment oil supply tube.

In a further embodiment of any of the above, wherein the scheduled damper supply tube extends through the bore.

In a further embodiment of any of the above, further comprising: a bearing support disposed within the bearing compartment; wherein the second mounting flange is operatively coupled to the bearing support.

In a further embodiment of any of the above, further comprising: a first passage formed in the bearing support and fluidicly coupled to the scheduled damper supply tube; and a second passage formed in the bearing support and fluidicly coupled to the compartment oil supply tube.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
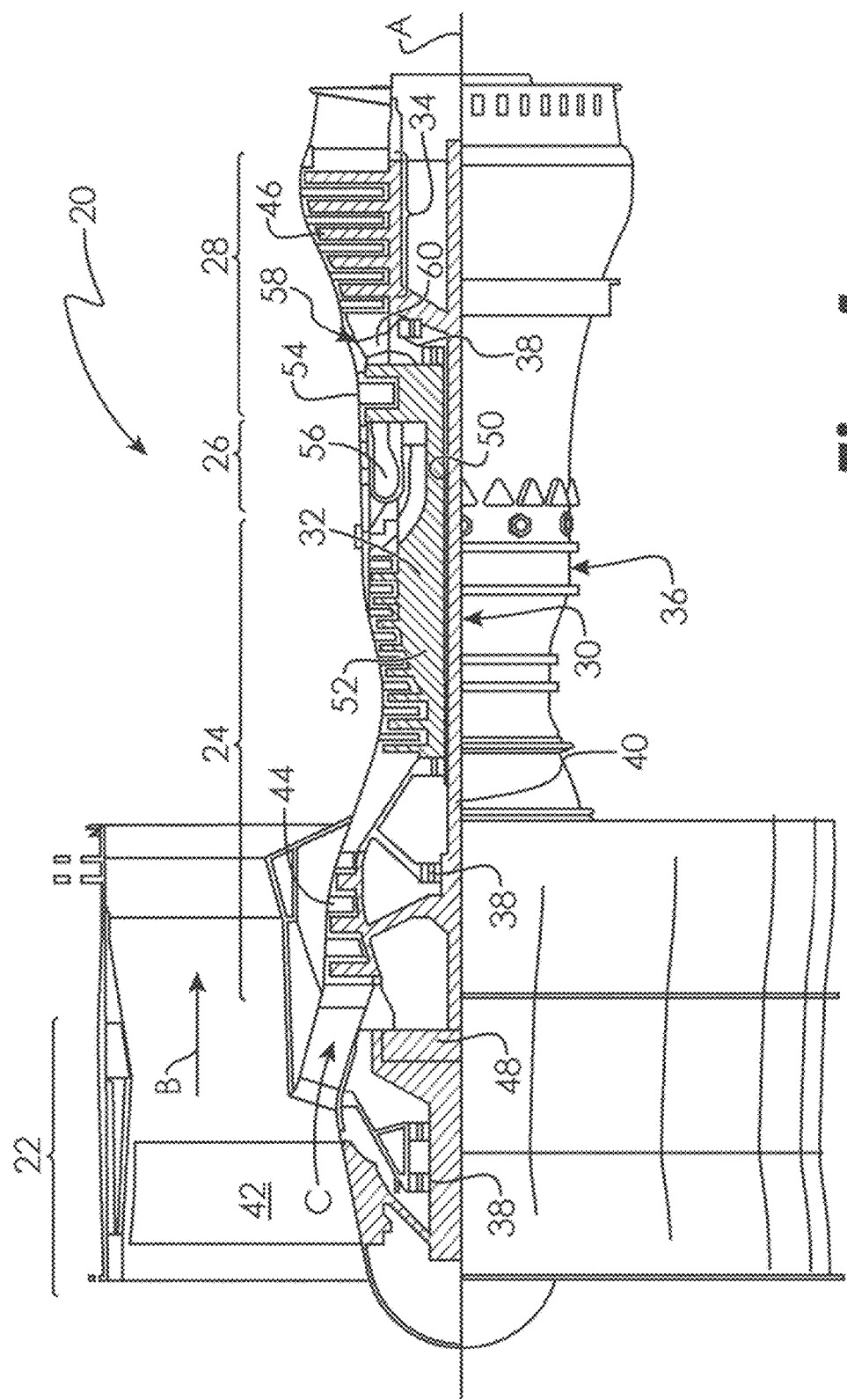
FIG. 1 is a schematic partial cross-sectional view of a gas turbine engine in an embodiment.
Figure 2:
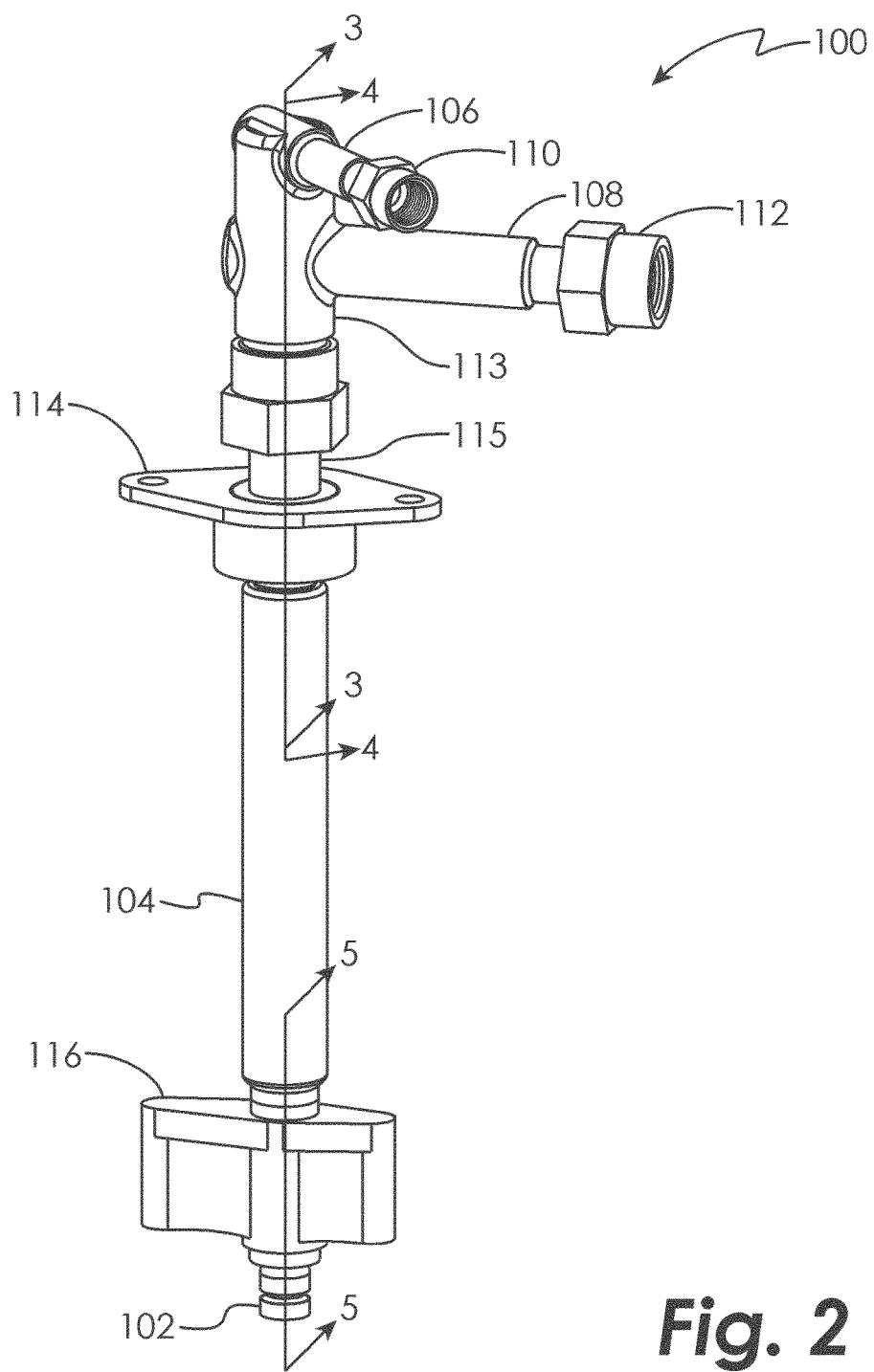
FIG. 2 is a schematic perspective view of a dual oil supply tube in an embodiment.
Figure 3:
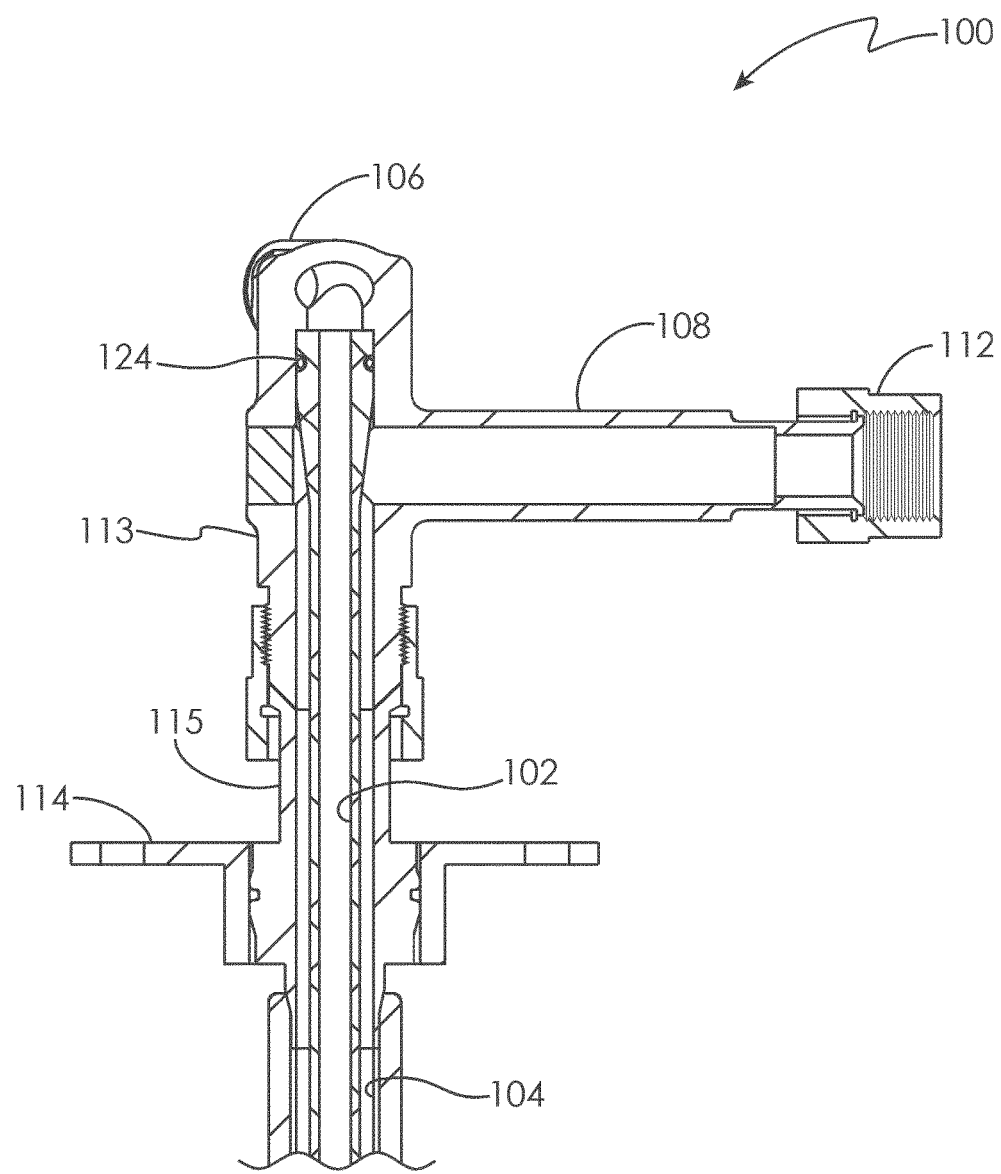
FIG. 3 is a schematic cross-sectional diagram of a portion of a dual oil supply tube in an embodiment.
Figure 4:
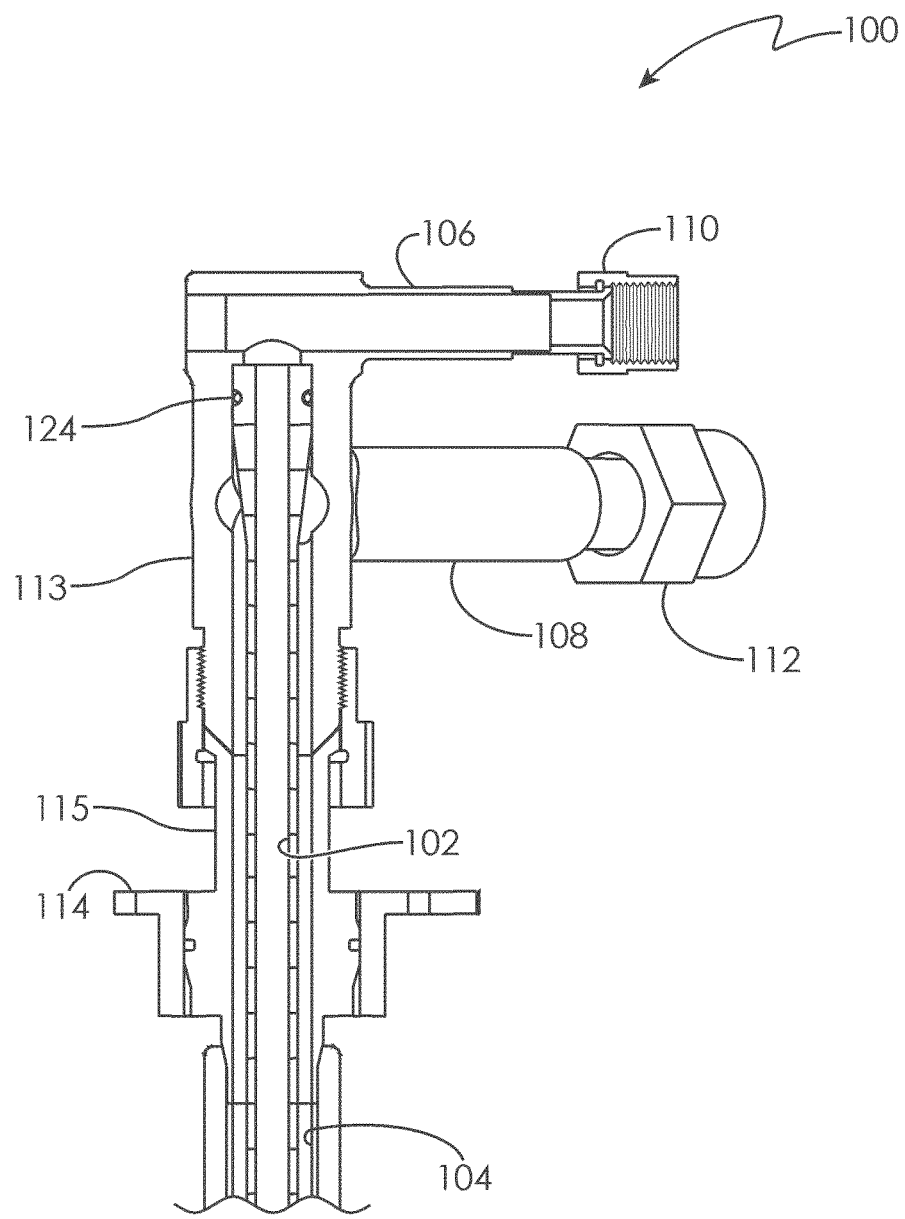
FIG. 4 is a schematic cross-sectional diagram of a portion of a dual oil supply tube in an embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram~°R)/(518.7°R)]^{0.5}$. The "Low corrected fan tip speed" as disclosed herein according to one non-limiting embodiment is less than about 1150 ft/second.

FIGS. 2-5 schematically illustrate a dual oil supply tube for a gas turbine engine in an embodiment, indicated generally at 100. As used herein, the word "oil" is intended to encompass any fluid used for the purposes of cooling, lubricating, or the creation of load-carrying films. The dual oil supply tube 100 locates a scheduled damper supply tube 102 inside a compartment oil supply tube 104 which remains full while the engine is operating. The compartment oil supply tube 104 supplies oil to a compartment containing a bearing in order to lubricate and cool the bearing. The bearing compartment is located within the engine static structure 36 (i.e., in a relatively hot environment). In some embodiments, oil flows through the compartment oil supply tube 104 continuously while the engine is operating. The compartment oil supply tube 104 may be insulated in an embodiment, such as by using a ceramic-based insulation to name just one non-limiting example. A supply connection 106 is provided at a proximal end of the dual oil supply tube 100 for introducing oil into the scheduled damper supply tube 102, while a separate supply connection 108 is provided at the proximal end for introducing oil into the compartment oil supply tube 104. The supply connection 106 may have a threaded connector 110 disposed thereon, while the supply connection 108 may have a threaded connector 112 disposed thereon in an embodiment. It will be appreciated that any desired means for connecting an oil supply to the scheduled damper supply tube 102 or the compartment oil supply tube 104 may be used. The supply connections 106 and 108 may be disposed outside of the engine static structure 36 and the core flow path C (i.e., in a relatively cool environment). A mounting flange 114 may be provided to couple the dual oil supply tube 100 to the engine case in an embodiment. As shown in the drawings, either or both of the scheduled damper supply tube 102 or the compartment oil supply tube 104 may be formed in multiple interconnecting sections in an embodiment. Portions of the compartment oil supply tube 104, such as the portions 113 and 115 located outside of the engine static structure 36 and the core flow path C, may comprise non-insulated materials in an embodiment.

Figure 5:
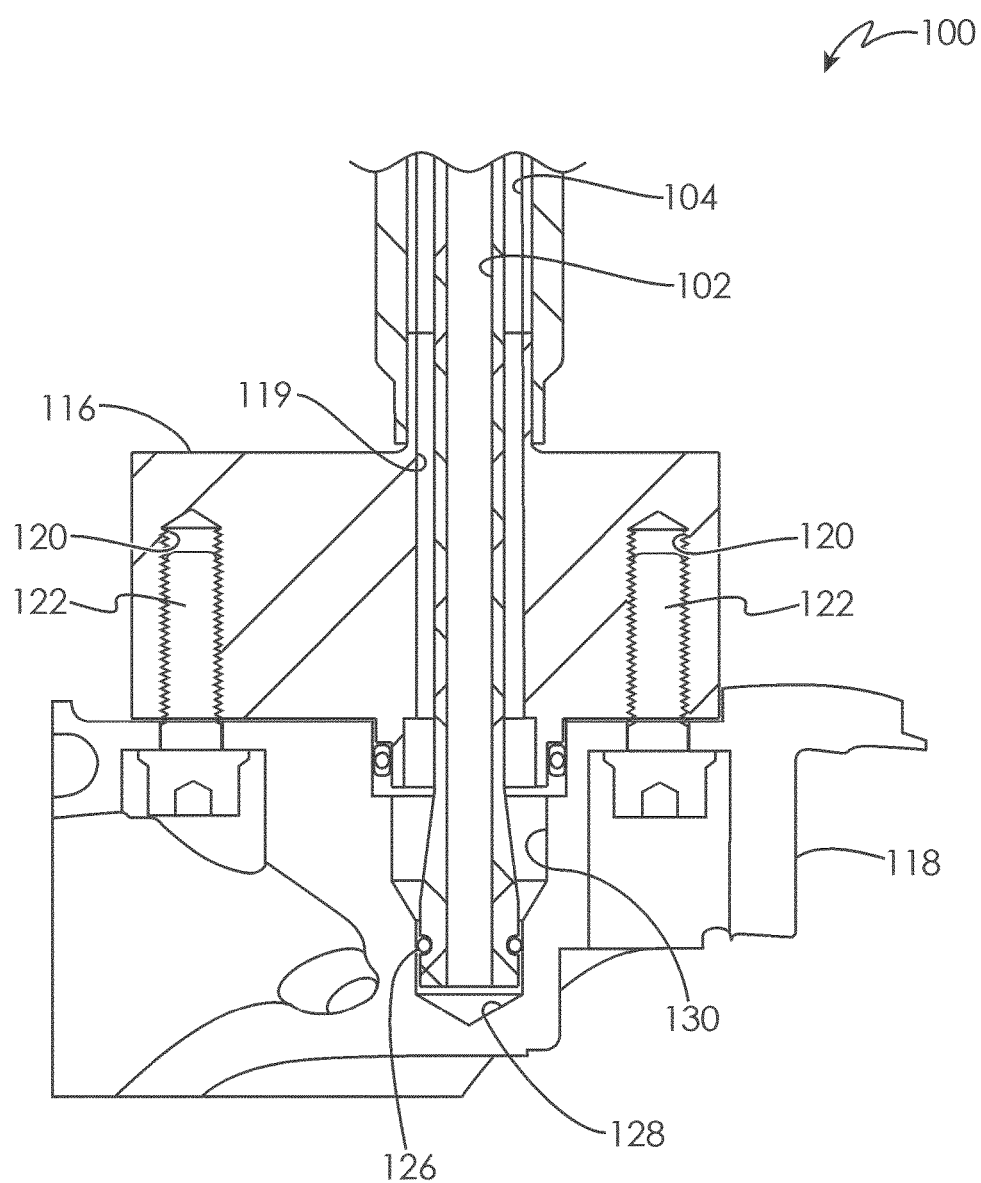
FIG. 5 is a schematic cross-sectional diagram of a portion of a dual oil supply tube mated to a portion of a gas turbine engine case in an embodiment.

At a distal end of the dual oil supply tube 100 a second mounting flange 116 may be provided. In an embodiment, the second mounting flange 116 is coupled to the compartment oil supply tube 104. The flange 116 may be used to couple the dual oil supply tube to a bearing support 118 in an embodiment, as shown in FIG. 5. The flange 116 may include a bore 119 formed therein in an embodiment to carry the oil flowing in the compartment oil supply tube 104. The scheduled damper supply tube 102 additionally extends through the bore 119 in an embodiment. In one embodiment, the flange 116 includes two threaded bores 120 into which a corresponding pair of threaded fasteners 122 may be installed to secure the flange 116 to the bearing support 118. Appropriate seals may be employed in the dual oil supply tube 100 to prevent fluid flow between the scheduled damper supply tube 102 and the compartment oil supply tube 104. For example, a seal, such as an o-ring seal 124, may be provided at the proximal end to prevent fluid flow between the supply connections 106 and 108, and hence between the scheduled damper supply tube 102 and the compartment oil supply tube 104 in an embodiment. Likewise, a seal, such as an o-ring seal 126, may be provided at the distal end to prevent fluid flow between scheduled damper supply tube 102 and the compartment oil supply tube 104 in an embodiment. The bearing compartment 118 may include appropriate passages for routing the oil received from the scheduled damper supply tube 102 and the compartment oil supply tube 104 in an embodiment, such as the passages 128 and 130. A seal, such as an o-ring seal 132, may be provided to prevent oil leakage from the passage 130 between the flange 116 and the bearing support 118.

It will be appreciated from the present disclosure that disposing the scheduled damper supply tube 102 within the compartment oil supply tube 104 allows the oil supply within the scheduled damper supply tube 102 to be interrupted without the risk of coking the residual oil left within the scheduled damper supply tube 102. This is because the continuous flow of oil within the compartment oil supply tube 104 and/or the insulated nature of the compartment oil supply tube 104 prevents the temperature within the scheduled damper supply tube 102 from increasing to a level where coking can occur, even when the dual oil supply tube 100 is utilized within hot sections of a gas turbine engine. Additionally, in some embodiments of the dual oil supply tube 100 allows the compartment oil supply and the damper oil damper supply to be route through the same strut of the engine case.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. In combination, a dual oil supply tube and a bearing compartment for a gas turbine engine, the dual oil supply tube comprising:
   a compartment oil supply tube fluidly coupled to the bearing compartment of the gas turbine engine; and
   a scheduled damper supply tube at least partially disposed within the compartment oil supply tube, the scheduled damper supply tube configured to supply oil to a damper of the gas turbine engine, a seal for preventing fluid flow between the bearing compartment and the scheduled damper supply tube.

2. The dual oil supply tube of claim 1, wherein the compartment oil supply tube continuously supplies oil to the bearing compartment of the gas turbine engine while the gas turbine engine is operating and the scheduled damper supply tube intermittently supplies oil to the damper in the bearing compartment.

3. The dual oil supply tube of claim 1, wherein the compartment oil supply tube comprises an insulated tube.

4. The dual oil supply tube of claim 3, wherein compartment oil supply tube includes a ceramic-based insulation material.

5. The dual oil supply tube of claim 1, further comprising:
   a first supply connection coupled to a proximal end of the scheduled damper supply tube; and
   a second supply connection coupled to a proximal end of the compartment oil supply tube.

6. The dual oil supply tube of claim 5, further comprising:
   a first threaded connector disposed on the first supply connection; and
   a second threaded connector disposed on the second supply connection.

7. The dual oil supply tube of claim 1, further comprising:
   a first mounting flange coupled to the compartment oil supply tube; and
   a second mounting flange coupled to the compartment oil supply tube.

8. The dual oil supply tube of claim 7, wherein the second mounting flange includes a bore formed therein, the bore fluidly coupled to the compartment oil supply tube.

9. The dual oil supply tube of claim 8, wherein the scheduled damper supply tube extends through the bore.

10. A gas turbine engine, comprising:
   a compressor section, a combustor section, and a turbine section in serial flow communication and disposed within an engine static structure defining a core flow path, the turbine section including a bearing compartment;
   a dual oil supply tube including a proximal end disposed exterior to the engine static structure and a distal end disposed within the engine static structure, the dual oil supply tube comprising:

a compartment oil supply tube configured to supply oil to the bearing compartment; and a scheduled damper supply tube at least partially disposed within the compartment oil supply tube, the scheduled damper supply tube configured to supply oil to a damper disposed within the bearing compartment.

11. The gas turbine engine of claim 10, wherein the compartment oil supply tube continuously supplies oil to the bearing compartment while the gas turbine engine is operating and the scheduled damper supply tube intermittently supplies oil to the damper in the bearing compartment.

12. The gas turbine engine of claim 10, wherein the compartment oil supply tube comprises an insulated tube.

13. The gas turbine engine of claim 12, wherein compartment oil supply tube includes a ceramic-based insulation material.

14. The gas turbine engine of claim 10, further comprising:

a first supply connection coupled to a proximal end of the scheduled damper supply tube; and a second supply connection coupled to a proximal end of the compartment oil supply tube.

15. The gas turbine engine of claim 14, further comprising:

a first threaded connector disposed on the first supply connection; and a second threaded connector disposed on the second supply connection.

16. The gas turbine engine of claim 10, further comprising:

a first mounting flange coupled to the compartment oil supply tube; and a second mounting flange coupled to the compartment oil supply tube.

17. The gas turbine engine of claim 16, wherein the second mounting flange includes a bore formed therein, the bore fluidly coupled to the compartment oil supply tube.

18. The gas turbine engine of claim 17, wherein the scheduled damper supply tube extends through the bore.

19. The gas turbine engine of claim 16, further comprising:

a bearing support disposed within the bearing compartment;

wherein the second mounting flange is operatively coupled to the bearing support.

20. The gas turbine engine of claim 19, further comprising:

a first passage formed in the bearing support and fluidly coupled to the scheduled damper supply tube; and a second passage formed in the bearing support and fluidly coupled to the compartment oil supply tube.

* * * * *